Patented Oct. 17, 1933

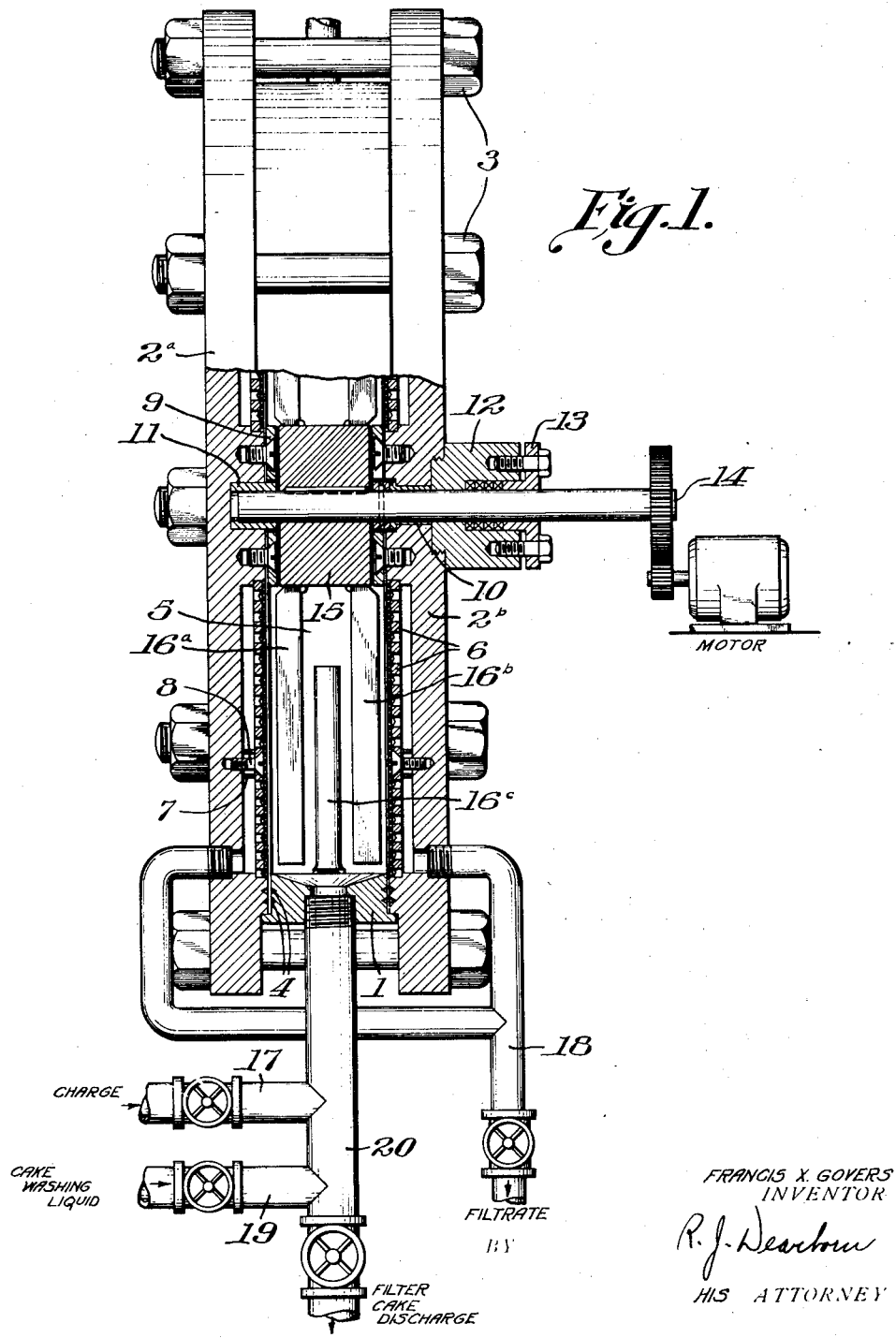

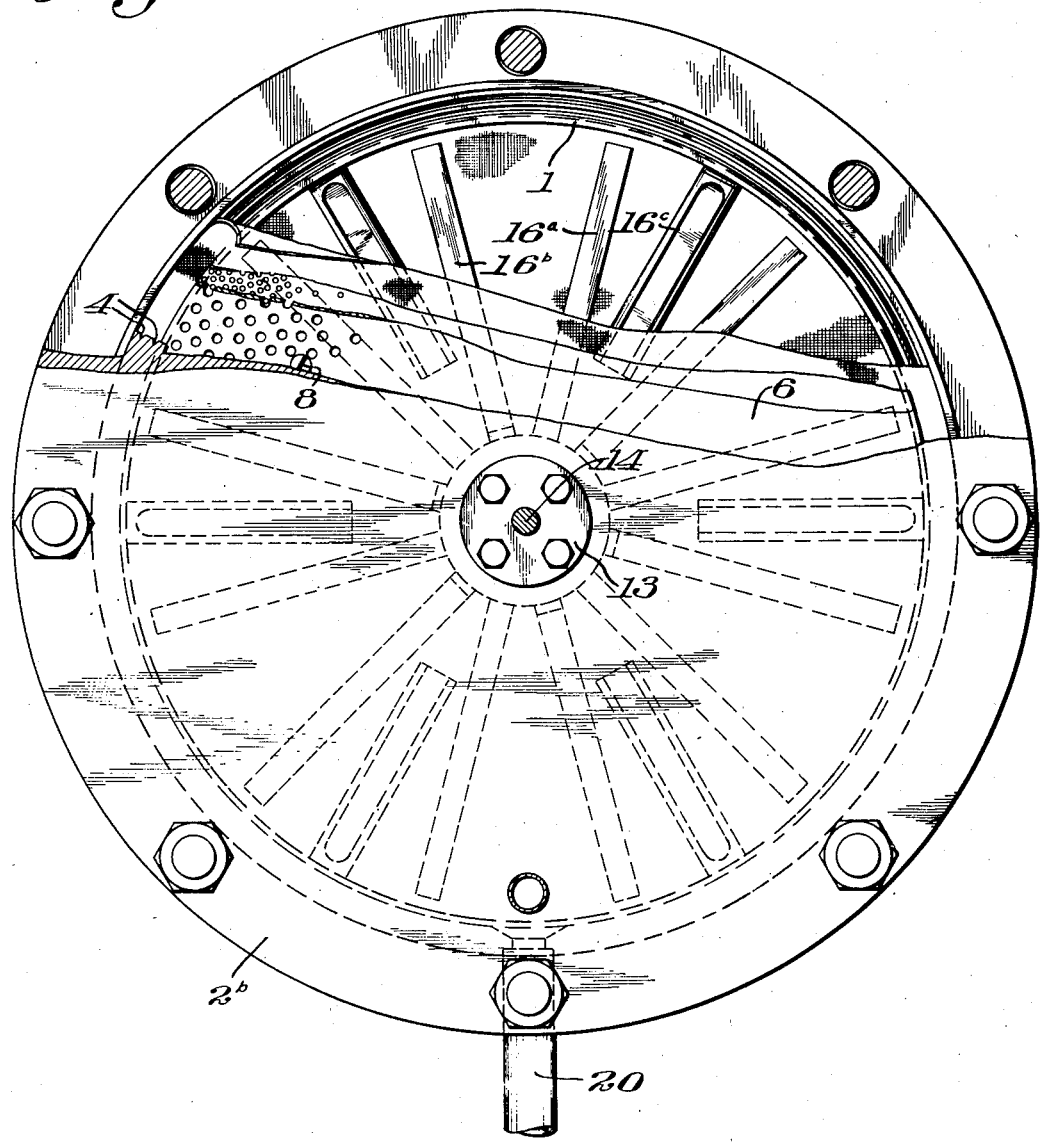

1,931,000

UNITED STATES PATENT OFFICE 1,931,000

APPARATUS FOR FILTRATION

Francis X. Govers, Vincennes, Ind., assignor to Indian Refining Company, Lawrenceville, Ill., a corporation of Maine Application December 27, 1932
Serial No. 648,869

4 Claims. (Cl. 210—192)

This invention relates to a method of and apparatus for filtering or separating solids from liquids and particularly wherein a mass of separated and suspended solids may be washed or extracted with a solvent to remove soluble constituents.

My invention contemplates an improved filter apparatus comprising a filter of the leaf type provided with internal stirring means for maintaining the filtering mixture of liquid and solids suspended therein in a suitable condition of turbulence within the filter to produce rapid filtration and uniform deposition of the solids on the filtering surface. It also provides a means for supplying solvent wash to the face of the filter cake while maintaining a suitable condition of turbulence productive of rapid washing and uniform distribution of solvent throughout the filter cake mass.

This application is a continuation-in-part of my copending application, Serial No. 585,844, filed January 11, 1932, for method of and apparatus for filtration.

An important feature of my invention is this provision of stirring arms within the filter means adaptable for effecting the rapid and easy discharge of the filter cake in the form of a slurry from the filtering means without the necessity of opening the filter.

The apparatus of my invention is adapted to the filtration of mixtures containing solid or semi-solid material or precipitates of jelly-like consistency which lack what are generally referred to as free-filtering qualities and which, as deposited, are difficult to filter out of the mother liquor. This condition is particularly noticeable in certain salts or compounds of alumina, and in certain precipitations produced by chilling a solution of petroleum hydrocarbon in a selective solvent. The invention is particularly well adapted to the removal of paraffin wax from chilled solutions of wax-bearing oil in suitable solvent liquids.

In the purification of many chemicals, as for example, aluminum hydroxide, blanc fixe or barium sulphate, etc., the purification frequently has to be of a very high degree and difficulty is found in washing from the precipitated solids the mother liquor and salts of reaction.

Ordinarily the salts of reaction distributed throughout a precipitated mass of material are removed by washing with a solvent while stirring, settling the washed precipitate and decanting the liquid layer. This process is repeated until the salts of reaction are practically eliminated. This is tedious, and in the case of flocculent precipitates which settle with difficulty a great amount of time is consumed and, in addition, the removal of the salts of reaction may never be complete.

In the forming of precipitates or crystals of chemical compounds, it is very difficult to form precipitates wherein all portions of the precipitate are of even size, and it is still more difficult to obtain crystals of uniform size. Due to this lack of uniformity, it is very difficult to obtain a deposit which is comparatively uniform in deposition, either upon the walls of a centrifuge or upon the surface of a filtering medium and due to this uneven deposition it is almost impossible, due to channeling, to completely and evenly wash the deposited solids without the use of undue amounts of solvent extractive material.

The use of undue amounts of solvent extractives in the case of compounds that are even slightly soluble in the solvent results in undesired contamination of the filtrate where the filtrate contains the desired purified products, or loss of material where the separated solids are the desired product.

Unevenness of size in precipitation or crystallization frequently gives masses that can be filtered only with great difficulty due to the fact that by segregation they form dense deposits on the filtering surface that are practically impervious to the passage of liquids. Attempts to prevent this dense deposit of separated small particles have been made by designing filters of the revolving leaf type, such as the Oliver and Valez, where the rotation of the leaf is supposed to result in even deposition of the filtering material. Presses of this type, however, are not of the wash type and cannot be used for this purpose. The ordinary wash filter of the plate and frame type does not permit of an even distribution of the washing media, and parts of the mass are overwashed and parts are decidedly underwashed.

In the case of many types of precipitates which are difficult to wash, it has been found advantageous to stir the mixture under filtration sufficiently to prevent any substantial deposition on the filter blankets, and when the material under filtration is sufficiently thickened, then introducing the wash solvent while maintaining the precipitate in suspension. When the washing is completed, the precipitate is removed from the filter in a slurry which is filtered in a plate and frame type filter to the desired percentage of solids, or is dried directly to the desired state of dryness in a drier, advantageously, of the spray type.

In order to describe the invention, reference will now be made to the figures of the accompanying drawings forming a part of this specification in which:

Fig. 1 is a view of the filter and its connections with a portion of the shell cut away to illustrate the interior thereof, and Fig. 2 is a view of the interior of the filter taken along the line 2—2 of Fig. 1.

In Figs. 1 and 2, the filter comprises a cylindrical body portion 1 and two circular end plates, $2^a$ and $2^b$, forming the ends of the cylindrical body portion and clamped in position with bolts 3 extending through corresponding holes at regular intervals around the peripheral edges of the plates. Corresponding grooves 4 are provided in the ends of the body 1 and the portion of the inner faces of the plates $2^a$ and $2^b$ contiguous thereto, in which packing or gasket material may be inserted. Instead of employing gasket material, these contiguous edges may be ball-jointed in order to make a leakproof joint.

The inner and adjacent faces of the plates $2^a$ and $2^b$ are cut away to form circular recesses 5 having substantially the same diameter as the internal diameter of the body portion 1.

A grid 6 extends across the recesses of both plates spaced a short distance therefrom by a spacer 7 and secured to the plates by screws 8. Filter cloth, or other fabric material suitable as a filtering surface, is laid over the grid and advantageously secured in position by having its outer edge clamped between the ends of the body portion 1 and the plates $2^a$ and $2^b$ and with its inner edges secured to the central portion of the plates by clamps 9.

The center of each plate $2^a$ and $2^b$ is drilled to provide bearings 10 and 11. The bearing 10 extends all the way through the center of the plate $2^a$, while bearing 11 advantageously extends only part way through the plate $2^b$. A stuffing box 12 is rigidly secured to the outer side of the plate $2^a$, adjacent to the bearing 10 forming a part of the bearing and provided with a packing gland 13. A shaft 14 extends through the stuffing box 12 and is rotatably supported within the bearings 10 and 11. Suitable driving means, such as a motor, may be provided for rotating the shaft at any desired speed.

Mounted on the shaft 14, and rigidly secured thereto, between the plates $2^a$ and $2^b$, is a hub 15. A plurality of stirring arms $16^a$ and $16^b$ extending radially outwards from the hub are secured thereto at regular intervals about the hub.

These stirring arms may be of any suitable shape. Although not shown in the drawings, an advantageous form of construction may comprise stirring arms of flat section adjustably mounted upon the hub 15 and also adapted to be set so that their faces will form different angles with respect to the axis of the hub 15. In this way, the position of the stirring arms may be altered to permit varying the clearance between the edges of the stirring arms and the adjacent filtering surfaces.

Stationary baffles $16^c$ are secured at intervals about the inner surface of the shell 1 and project inwardly towards the hub 15 midway between the filtering surfaces so as not to interfere with the rotation of the revolving arms $16^a$ and $16^b$. The centrally disposed fixed baffles prevent the formation of a substantial mass of solid material between the adjacent filtering surfaces, and which would rotate, or tend to rotate, with the revolving arms, and also cause the filter cake to revolve relatively to the filtering surface. These fixed baffles act as breakers and permit maintaining sufficient turbulence within the filtering solution to prevent gravity settling without, at the same time, hindering the deposition of solids upon the vertical filter surfaces in the form of a filter cake which does not move relatively to the filter surface in the manner just mentioned.

The arms $16^a$ and $16^b$, as shown in the drawings, revolve in the space between the stationary baffles and the filtering surfaces and in close proximity to the latter. When arranged in this fashion the space between the revolving arms $16^a$ and $16^b$ should, of course, be adjusted so as to permit formation of a filter cake of customary thickness.

Although the drawing illustrates a filter shell having a single pair of filter spaces with the spaces and filtering elements forming the filter shell, it is contemplated that the filter could comprise a plurality of such filtering elements and spaces provided with a plurality of of stirring arms, or the filter may comprise an independent drum or shell containing one or more hollow filter leaves supported therein and having revolving stirring arms mounted between such pair of leaves. While stationary filter surfaces have been described, it is contemplated that my invention may be advantageously applied to a filter having rotating leaves.

In the operation of the filter as, for example, in connection with a process for the separation of wax from hydrocarbon oils, a chilled mixture consisting of wax-bearing mineral oil and a solvent liquid, which latter may comprise, for example, 65% of benzol and 35% of acetone, is introduced to the space between the filtering surfaces through a pipe 17 leading from a chilling tank or other source of supply not shown.

The filtrate passes through the filtering surface into the recessed portions 5 from which it is withdrawn through a pipe 18. Wax or solid hydrocarbons contained or suspended in the mixture introduced to the filter is deposited on the surface of the filter cloth. During filtration, the shaft 14 with the stirring arms $16^a$ and $16^b$ attached thereto is rotated, usually at a slow rate of speed, say about 10 R. P. M., in order to keep the solid hydrocarbons in suspension in the liquid hydrocarbons until deposited upon the filtering surface.

When a cake of desired thickness has been formed, a quantity of fresh chilled solvent mixture may be introduced to the interior of the filter through a pipe 19 to wash out any mother liquor adhering to the cake. During this washing step, the operation of the stirring mechanism is continued.

Upon completion of the washing of the cake, the filtrate discharge pipe 18 is closed and chilled solvent liquid is introduced until the filter is entirely filled. The speed of the rotating arms is then increased to a relatively high rate, say until about 80 R. P. M. is reached. Due to the violently turbulent condition thus produced within the filter, the cake is dislodged from the filtering surface and converted into a slurry which is then discharged from the filter through a pipe 20.

If desired, a displacing medium, such as gas under pressure or any other suitable fluid means, may be introduced to the filter through a pipe 150

21 to facilitate discharging the filter cake slurry from the filter.

Obviously many modifications and variations of the invention, as hereinbefore set forth, may be made without departing from the spirit and scope thereof, and therefore only such limitations should be imposed as are indicated in the appended claims.

I claim:

1. A filter apparatus comprising a closed shell, hollow filtering elements supported within the shell at spaced intervals, a shaft extending axially through the shell and filter elements and rotatably supported therein, stirring arms secured to said shaft extending radially outward therefrom and adapted to revolve between the adjacent filter elements, stationary baffles secured to the inner surface of the filter shell extending inwardly towards said shaft between adjacent filter elements and adapted to effect, in cooperation with the revolving arms, turbulence of the filtering mixture and to prevent movement of the filter cake relative to the filtering surface, means for rotating the shaft, means for introducing the mixture to be filtered to the interior of the shell surrounding the filter elements, and means for removing filtrate from the interior of the elements.

2. A filter apparatus comprising a closed shell, hollow filtering elements supported within the shell at spaced intervals, a shaft extending axially through the shell and filter elements and rotatably supported therein, stirring arms secured to said shaft adapted to revolve between the elements and within close proximity to the filtering surface of each filter element, stationary baffles secured to the inner surface of the filter shell extending inwardly towards said shaft substantially midway between the filter elements, and adapted to effect, in cooperation with the revolving arms, turbulence of the filtering mixture and to prevent movement of the filter cake relative to the filtering surface, means for rotating the shaft, means for introducing the mixture to be filtered to the interior of the shell surrounding the filter elements, and means for removing filtrate from the interior of the elements.

3. A filter apparatus comprising a horizontal cylindrical shell, a plurality of hollow filtering elements supported within the shell and spaced at short intervals throughout its length, a shaft extending axially through the shell and through openings provided in the center of each filter element and rotatably supported in the ends of said shell, stirring arms secured to said shaft extending radially outward therefrom and adapted to revolve between the adjacent filter elements, stationary baffles secured to the inner surface of the filter shell extending inwardly towards said shaft between adjacent filter elements and adapted to effect, in cooperation with the revolving arms, turbulence of the filtering mixture and to prevent movement of the filter cake relative to the filtering surface, means for rotating the shaft, means for introducing the mixture to be filtered to the interior of the shell surrounding the filter elements, and means for removing filtrate from the interior of the elements.

4. A filter apparatus comprising a shell, a pair of adjacent filtering surfaces within the shell, a shaft extending axially through the shell and filter surfaces and rotatably supported therein, stirring arms secured to said shaft extending radially outward therefrom and adapted to revolve between the adjacent filter surfaces, stationary baffles secured to the inner surface of the filter shell extending inwardly towards said shaft between adjacent filter surfaces and adapted to effect, in cooperation with the revolving arms, turbulence of the filtering mixture and to prevent movement of the filter cake relative to the filtering surface, means for rotating the shaft, means for introducing the mixture to be filtered to the filter shell, and means for removing filtrate after passage through the filtering surfaces.

FRANCIS X. GOVERS.